March 7, 1944. R. FINK 2,343,288

AUTOMATIC PILOT

Filed May 22, 1942 2 Sheets-Sheet 1

INVENTOR
RUDOLPH FINK

March 7, 1944.  R. FINK  2,343,288
AUTOMATIC PILOT
Filed May 22, 1942  2 Sheets-Sheet 2
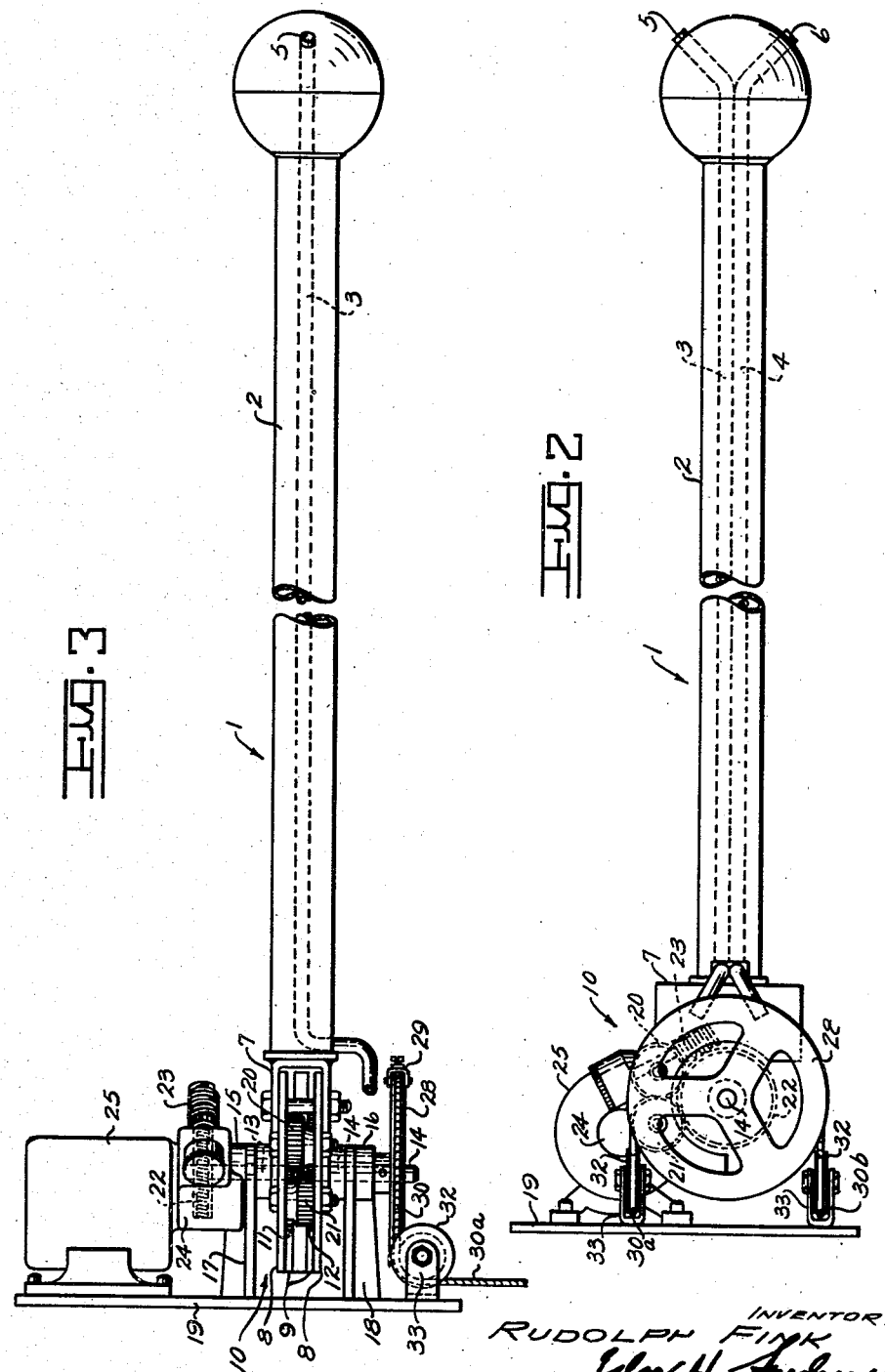
INVENTOR
RUDOLPH FINK
BY
ATTORNEYS Patented Mar. 7, 1944

2,343,288

UNITED STATES PATENT OFFICE 2,343,288

AUTOMATIC PILOT

Rudolph Fink, United States Army,
Patterson Field, Ohio

Application May 22, 1942, Serial No. 444,059

6 Claims. (Cl. 244—78)

(Granted under the act of March 3, 1883, as
amended April 30, 1928; 370 O. G. 757)

The invention described herein may be manufactured and used by or for Government for governmental purposes, without the payment to me of any royalty thereon.

This invention relates to an automatic pilot for an aircraft in which the aircraft is controlled about at least one of its axes of motion by servo mechanism, which in turn is controlled by pressure-responsive means which responds to deviation of the aircraft in pitch or yaw from a desired flight attitude as distinct from automatic control devices which employ a horizontal or vertical reference means such as gyroscopes, pendulums and the like, as a primary control means.

It has been proposed in the prior art to utilize the difference in pressure between points on the upper and lower surfaces of an aircraft wing as a measure of the angle of attack of the wing with respect to the relatively moving air stream and to utilize such a pressure difference in a source of primary control for an automatic elevator control. Such a proposed control system, however, cannot ordinarily be employed for actuation of the ailerons or rudder and has the further disadvantage that it would be subject to hunting since there is no way of applying a follow-up from the controlled element such as the elevators to cancel the primary control effect so that the controlled element deflection is proportional to the magnitude of the primary control effect.

In accordance with the present invention a sensitive control element in the form of a yawmeter head is pivotally supported on the aircraft, preferably on the wing, and adapted to move in a vertical plane for elevator control. The yawmeter head is connected to a differential pressure-responsive device which is adapted to shift the pilot valve of a hydraulic servomotor such as now generally employed on automatic pilots, the servomotor being connected to actuate the aircraft elevators. The pivotal mounting for the yawmeter head includes a three-leg differential gear in which the yawmeter is secured to and rotatable with the carrier or one leg of the differential. A second leg of the differential is adapted to be rotated by an electric motor under manual control so as to alter the axis of the yawmeter head in the vertical plane with respect to the longitudinal axis of the airplane, and the third leg of the differential being connected by follow-up cables to the elevator control so that control movement of the same will cause a motion of the yawmeter head in a direction so as to cancel the initial control effect so that when the aircraft is restored to the level flight position it will not overshoot and cause a hunting about the desired equilibrium position. By structure as provided in accordance with the invention it becomes possible to construct an automatic pilot which depends only on the change in angle of attack of the aircraft from a predetermined angle to initiate an elevator control impulse, and by the provision of a follow-up, a stable control system is obtained.

In order to obtain automatic directional and lateral control, an exactly similar system is employed as above described, except that the servomotor is connected to the ailerons and the yawmeter head is mounted for movement in a transverse plane. The directional control is accomplished by virtue of the fact that in practically all present-day aircraft the aircraft can be maintained on a straight course by use of the ailerons alone, i. e. banking will produce turning of the aircraft and vice versa any turning will produce banking or lateral deviation of the aircraft so that any directional deviation from a set course as sensed by the directional yawmeter will produce a lateral banking which will introduce a corrective turning moment, and since any lateral deviation will produce a directional change, the control will also act to restore the aircraft to a laterally level position. By rotating the axis of the directional control yawmeter head laterally with respect to the longitudinal axis of the airplane, turns at a substantially constant rate may be accomplished. Although it is preferred to obtain both lateral and directional control through the control of the ailerons, the rudder may be actuated by the servomotor so that it will be deflected to produce the required turning moments.

The principal object of the invention is the provision of a power-actuated automatic control means for controlling an aircraft about at least one of the axes of motion thereof, comprising a pivotally mounted head exposed to the air stream and operative to produce a differential pressure indicative of any change in the angle of the longitudinal axis of the aircraft with respect to the relatively moving air stream in a given plane from a predetermined angle, and having connected thereto a pressure-responsive means responsive to the said differential pressure for controlling servo mechanism connected to one of the sets of the aircraft control surfaces such as the elevators, the rudder, or the ailerons to cause a displacement of the same to restore the aircraft to its predetermined flight attitude with respect to the relative wind and a follow-up connection between the actuated control surface and the pivoted head operative to cause a movement of said head in the direction towards its equilibrium position with respect to the relative wind to thereby produce a stable control system.

Another object of the invention is the provision of an automatic directional and lateral control device for aircraft comprising a pivotally mounted yawmeter head, a pressure-responsive means actuated by differential pressure generated by said head in accordance with departure from a predetermined heading with respect to the relative wind, power-actuated servo mechanism connected to the ailerons to actuate the same, control means for said servo mechanism operated by the differential pressure-responsive means and a follow-up connection between the ailerons and the said yawmeter head operative to move said head in a direction opposite the direction of aircraft directional deviation.

Other objects of the invention will appear by reference to the detailed description hereinafter given and to the appended drawings in which:

Figure 2 is an enlarged side elevation illustrating the detail construction of the yawmeter control device of Figure 1;

Figure 3 is a top plan view of the device of Figure 2, and;

Figure 1:
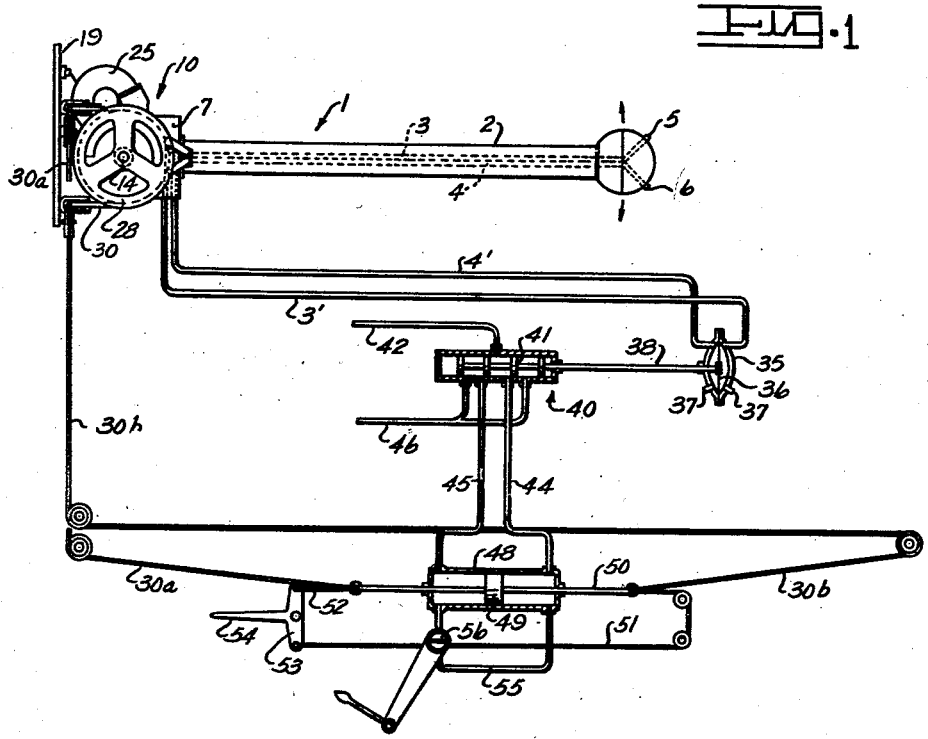
Figure 1 is a schematic representation of an automatic aircraft elevator control system in accordance with the invention.

Referring now to Figure 1, the reference numeral 1 generally indicates a yawmeter head of a construction per se well known in the art and comprising a tubular housing 2, which encloses a pair of conduits 3 and 4 which terminate at their outer ends respectively in ports 5 and 6 equally angularly spaced on opposite sides of the longitudinal centerline of the tubular housing 1, and the ports 5 and 6 serving as dynamic pressure openings. The conduits 3 and 4 at their inner ends are connected by flexible tubes or the like to conduits 3' and 4' which are connected to a pressure-responsive means hereinafter described. The tubular housing 1 is secured at its inner end to a forked fitting 7 which is movable with the carrier or one leg of a three-leg differential generally indicated by the reference numeral 10 and the details of which as seen in Figures 2 and 3 will now be described.

Referring to Figures 2 and 3, the forked support 7 for the yawmeter head 1 is bolted to a pair of spaced side plates 8 which are maintained in spaced relation by suitable spacers 9. A pair of spur gears 11 and 12 are arranged in spaced relation between the side plates 8 and are secured respectively to shafts 13 and 14 which are rotatably journalled in suitable bearing bosses formed integral with the side plates 8 and further journalled adjacent their outer ends respectively in bearings 15 and 16 carried by bracket plates 17 and 18 respectively, which are secured to a mounting plate 19, which in turn may be secured for example to the front spar of an aircraft wing.

A pair of planetary spur gear pinions 20 and 21 are positioned between the side plates 8 and suitably rotatably journalled on pins carried by the plates, which are so positioned that the gears mesh with each other and respectively mesh with the side gears 11 and 12 to form a differential. The side gear 11 and shaft 13 form one leg of the differential, side plates 8 and planet gears 20 and 21 form a second leg or the carrier of the differential and gear 12 with shaft 14 forms the third leg of the differential.

The shaft 13 has a worm gear 22 mounted thereon at its outer end which is adapted to mesh with a worm 23 driven by a gear reduction 24, which is drivingly connected to a reversible electric motor 25 which may be connected to any suitable source of power and controlled by a manually actuated reversing switch, not shown. If the motor 25 is energized to run in either direction and gear 12 and shaft 14 considered as being stationary, then shaft 13 will drive gear 11 which will in turn drive planet gears 20 and 21 causing the latter gear to planetate around gear 12 and carrying side plates 8 therewith and causing the yawmeter head 1 to be raised or lowered. In this manner the initial angle of the longitudinal centerline of the yawmeter head 1 with respect to a horizontal plane passing through the longitudinal axis of the airplane may be adjusted. The shaft 14 has a pulley 28 mounted on the outer end thereof which pulley is provided with a cable clamp 29 which clamps a follow-up cable 30 to the pulley so as to cause rotation of the same, the upper and lower branches 30a and 30b of the cable passing over respective guide pulleys 32 which are pivotally mounted in brackets 33 secured as by welding to the mounting plate 19. If the pulley 28 is rotated in either direction by movement of follow-up cable 30 and gear 11 being stationary, rotation of shaft 14 will rotate gears 21 and 20 causing the latter to planetate about stationary gear 11 and thus cause rotation of the carrier plates 8 and yawmeter head 1 to produce a follow-up movement of the head in a vertical plane relative to the longitudinal axis of the airplane.

Referring again to Figure 1, the conduits 3' and 4' are as previously noted connected to a pressure-responsive device which is indicated by the reference numeral 35 and being of the double-acting type having a central diaphragm 36 which divides the housing into two expansible chambers which respectively connect to the conduits 3' and 4' and the chambers being vented to the atmosphere through restricted air bleeds 37. Any increase in pressure in one of the conduits 3' or 4' will cause deflection of the diaphragm 36 which will cause displacement of a valve rod 38 in the corresponding direction from a neutral position and shift a pilot valve 41 of a servomotor control valve generally indicated by the reference numeral 40. Shifting of pilot valve 41 in either direction from a neutral position, permits oil under pressure from a supply conduit 42 to pass to either one of a pair of conduits 44 or 45 and connecting the other of the conduits to an exhaust conduit 46. The conduits 44 and 45 are connected to opposite ends of a servomotor cylinder 48 which has a piston 49 operative to actuate the piston rod 50 in either direction. Piston rod 50 is connected at opposite ends thereof to cables 51 and 52 which are connected to a double arm lever 53 which is adapted to actuate for example aircraft elevators 54, a bypass conduit 55 and valve 56 being provided for rendering the servomotor inoperative to allow manual control by means, not shown. The piston rod 50 is also connected at alternate ends to the portions 30a and 30b of the follow-up cable 30, so that any movement of the control surface 54 through the action of servomotor piston 49 will cause a movement of yawmeter head 1 in a direction to cancel the control pressure created thereby.

*Operation*

When the device of Figure 1 is installed in an airplane to accomplish elevator control, the yawmeter head axis is adjusted through differential 10 by energizing motor 25 to run in the desired direction, so that the axis of the yawmeter head coincides with the direction of the relative wind for the particular air speed and corresponding angle of attack of the airplane, for example for a selected cruising speed. As long as the aircraft flies at the selected air speed, the air stream will strike the dynamic pressure ports 5 and 6 so as to produce an equal pressure in conduits 3 and 4, and no differential pressure will be produced in the pressure-responsive device 35 and the pilot valve 41 will remain in the neutral position, allowing the oil under pressure from conduit 42 to flow directly to exhaust conduit 46.

If now it is assumed that the aircraft increases its angle of attack with respect to the relatively moving air stream, the pressure at port 6 of the head 1 will increase and the pressure at port 5 will decrease, which will produce a corresponding difference in pressure in conduits 3' and 4', causing diaphragm 36 of the pressure-responsive device 35 to move to the right as seen in Figure 1, which movement is transmitted to pilot valve 41. Movement of valve 41 to the right will connect conduit 44 to the high-pressure oil supply and vent conduit 45 to drain, the oil under pressure in conduit 44 being admitted to servomotor cylinder 48 to cause piston 49 to move to the left as seen in Figure 1. Movement of the piston 49 to the left will, through piston rod 50, tension cable 51 to deflect the elevators 54 down, which will produce a restoring control force tending to cause the airplane to return to the preselected angle of attack. As the elevators 54 are deflected downward, piston rod 50 will tension follow-up cable 30b, which will cause pulley 28 and shaft 14 to be rotated in a clockwise direction (Figures 2 and 3) which will cause, through gear 11, a counterclockwise rotation of planet gear 21 and a clockwise rotation of planet gear 20 which will roll around stationary gear 11 and rotate carrier plates 8 in a clockwise sense, the rotation of the latter moving the axis of the yawmeter head downward through an angle proportional to the deflection of the elevators 54. The follow-up motion of the yawmeter head may be made sufficient to entirely cancel the primary control effect since the restoring movement of the yawmeter head causes equalization of pressure at ports 5 and 6 causing a reversal in the direction of movement of the pilot valve and causing the servomotor also to reverse its motion. The operation of the follow-up is thus such that when the airplane is restored to its preselected angle of attack, the elevators will be restored to the neutral position and the axis of the yawmeter head will again be in its initial position.

When the aircraft, for example, decreases its angle of attack below the preselected value, the pressure difference created at ports 5 and 6 will be of opposite character from that described above and the elevators will be moved upward to cause a down load on the tail of the airplane, causing the same to restore the aircraft to its predetermined angle of attack. The action of the follow-up will also be in the opposite direction from that as described above.

It will be noted that the action of the follow-up is such that the yawmaker head tends to always be restored to a position so that the longitudinal axis of the head is parallel with its initial position with respect to the relative wind, i. e. if the airplane increases its angle of attack causing the elevators to be depressed the yawmeter head will be rotated in a clockwise sense to return to its initial position with respect to the relative wind and as the elevators move in a reverse direction toward the neutral position, as the airplane is restored to the correct flying position, the yawmeter head will be rotated in a counterclockwise sense.

The ratio of the follow-up movement of the yawmeter head to the control surface deflection is of course determined by the diameter of the follow-up pulley 28 (Figure 1) as compared to the stroke of the servomotor piston 49 and this ratio may be made of a value suitable for the control characteristics of the particular airpplane in question.

The sensitivity of the control system is controlled by the response of the diaphragm 36 of the pressure-responsive device 35, Figure 1, for a given pressure difference between the conduits 3' and 4' (Figure 1) and this sensitivity may be varied by change in the area or elastic characteristics of the diaphragm.

The control system heretofore described as applied to the longitudinal control of an aircraft is also applicable to the lateral or directional control of an aircraft, and in order to obtain such a control it is only necessary to employ a duplicate of the control system illustrated in Figure 1 and mount the differential unit and yawmeter head thereof so that the latter is movable in a transversce plane, the servomotor being connected to control the ailerons in a well-known manner.

Figure 4:
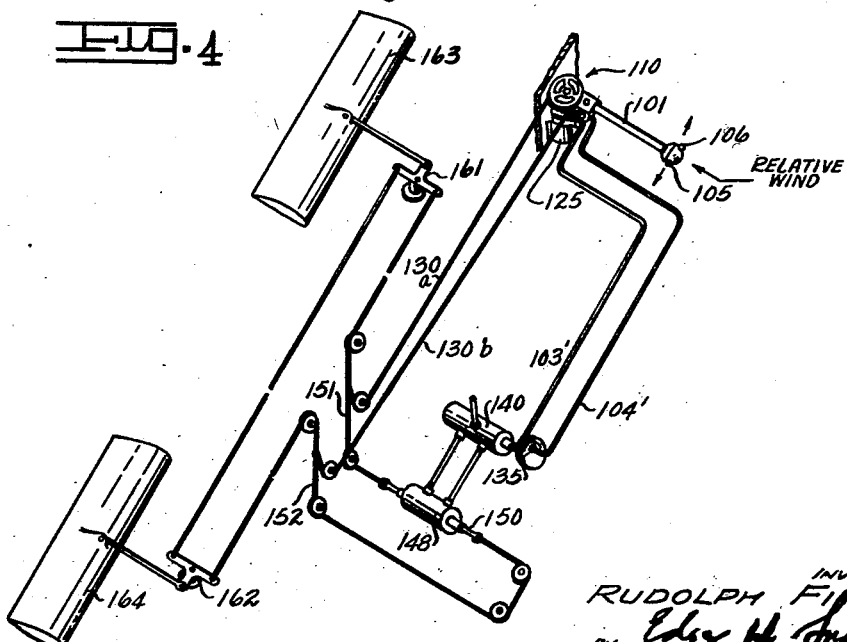
Figure 4 is a schematic illustration of the installation of the automatic control in an airplane for lateral and directional control thereof.

The arrangement of the parts for directional control is illustrated in Figure 4, in which figure the equivalent parts to the device of Figure 1 are indicated by the same reference numeral plus one hundred. As seen in Figure 4 the yawmeter head 101 having dynamic pressure ports 105 and 106 is mounted, for example on the airplane wing or fuselage, for movement laterally and adapted to be actuated by the differential unit 110 in the same manner as in the device of Figure 1 and the initial position of the yawmeter head is determined by operation of motor 125 through a suitable manually controlled switch, not shown, and a suitable indicator, also not shown, operated by movement of the yawmeter head may be employed to indicate the angular position of the longitudinal axis of the head with respect to the longitudinal axis of the airplane. The yawmeter head has its dynamic pressure ports 105 and 106 connected to the valve operating pressure-responsive device 135 by conduits 103' and 104' and the motor 135 is adapted to actuate pilot valve 140 which in turn controls the servomotor 148 in the same manner as in the system of Figure 1. The servomotor 148 has its piston rod 150 connected to the cables 151 and 152 which in turn are adapted to actuate bell cranks 161 and 162 respectively of a conventional aileron control system for actuating the ailerons 163 and 164 respectively in opposite directions, the latter also being adapted to be controlled in a well-known manner by a manual means, not shown. The follow-up cables 130a and 130b transmit a follow-up motion to the differential 110 in the same manner as in the device of Figure 1.

Operation

The device of Figure 4, when employed to maintain the associated aircraft on a predetermined course is initially set by the pilot through operation of the motor 125 so that the axis of the yawmeter head 101 is aligned with the longitudinal axis of the aircraft after the latter has been placed on the proper heading. If thereafter the aircraft should yaw to the left, there will be an increase in dynamic pressure at port 106 which will cause pressure-responsive device 135 to actuate valve 140 to the right, which will in turn cause operation of the piston of servomotor 148 to the left causing aileron 164 to move up and aileron 163 to move down.

It is a well-known fact that in aircraft which do not have excessive directional stability, a yawing moment is also accompanied by a rolling moment and vice versa, and an aircraft can be controlled both laterally and directionally by use of the ailerons alone and in the present invention the aileron movement as above described will produce a rolling moment tending to raise the low wing and which will cancel the yawing moment, thus restoring the aircraft to its original heading. The movement of the ailerons produces a follow-up movement of the yawmeter head 101 towards the right which cancels the control signal and reverses the direction of movement of the servometer so that the aileron deflection is proportional to the instant deviation in yaw and as the aircraft is laterally restored to the level position, the ailerons return to the neutral position and the yawmeter head is again in alignment with the longitudinal axis of the aircraft.

When the aircraft yaws to the right, the automatic control operates in a reverse sense from that as above described.

When the pilot desires to make a change in course, for example, to turn left (looking forward as seen in Figure 4), the pilot, through manual control of motor 125, causes the yawmeter head 101 to move to the right an amount dependent upon the desired radius of turn for the then existing air speed, and upon the yawmeter head being so deflected there will be an increase in the dynamic pressure at port 105 which will cause the pressure-responsive device 135 to shift the valve 140 to the left, which will cause a movement of the servomotor 148 in the opposite direction. The aileron 163 will be caused to move up and aileron 164 to move down, thus banking the aircraft in a counterclockwise sense which will cause the aircraft to turn to the left. As the airplane banks, the follow-up motion of the yawmeter head is to the left tending to restore the same to its initial position, also causing the ailerons to move to the neutral position and leaving the aircraft banked the desired amount, so that it will continue to turn at a constant rate for any given air speed. The turn may be stopped by operation of the electric motor 125 in a reverse sense an equal amount, and the reverse operation of the ailerons will take place restoring the aircraft to the laterally level position and with the yawmeter head again aligned with the longitudinal axis of the airplane.

Lateral tilting of the aircraft in either direction will cause the aircraft to turn either to the right or left from the desired predetermined course, which turning will set the directional control into operation to cancel the turning moment by applying the opposite aileron which will result in the aircraft being restored to the laterally level position so that the automatic control system of Figure 4 serves the dual function of a lateral and directional control.

While the invention has been illustrated and described as employing pneumatic actuation of the pilot valve controlling the main servomotor, it is obvious that electrical means could also be employed and that other changes and modifications of the invention will become apparent to those skilled in the art as coming within the scope of the invention as defined by the appended claims.

I claim:

1. In an automatic control device for controlling an aircraft about at least one of the axes of movement thereof, reversible servomotor means operatively connected to a control element of the aircraft, control means for said servomotor adapted to cause selective actuation of said servomotor, pivotally supported means exposed to the air stream and adapted to generate a differential pressure proportional to the change in attitude of the aircraft from a predetermined attitude with respect to the relative air stream, pressure-responsive means responsive to differential pressures generated by said last named means, said pressure-responsive means being operatively connected to said servomotor control means to cause selective actuation of the same and follow-up means operatively connecting said servomotor and said pivotally supported means to cause a rotation of the latter in a direction opposite the deviation of the aircraft from the said predetermined attitude.

2. Means for automatically actuating a control surface of an aircraft comprising a reversible servomotor connected to said surface to actuate the same, control means for said servomotor to cause selective actuation thereof, differential-pressure-responsive means operatively connected to said servomotor control means to selectively actuate the control means, a rotatably mounted longitudinally extending head exposed to a relatively moving air stream and having a pair of dynamic pressure ports equally angularly disposed with respect to the longitudinal axis of said head, connections between said ports and said differential-pressure-responsive means, and follow-up means operative to rotate said rotatably mounted head in response to movement of said control surface by said servomotor and in a direction tending to maintain the longitudinal axis of said head parallel with the relatively moving air stream.

3. In an automatic elevator control for an aircraft, a reversible servomotor for actuating the elevators of the aircraft to restore the aircraft to a predetermined attitude with respect to the relative wind, a control element for selectively controlling the energizing of said servomotor, differential-pressure-responsive means for actuating said control element, a yawmeter head exposed to the air stream and having a pair of dynamic pressure ports equally angularly disposed above and below the longitudinal axis of said head and said ports being respectively connected to said pressure-responsive means so that the latter is caused to be actuated in one or the other control sense upon increase or decrease respectively in the pressure in one of said ports over the pressure in the other of said ports upon change in the aircraft flight attitude in one or the other direction from a predetermined attitude with respect to the relative wind, means for pivotally supporting said yawmeter head for rotary movement in a vertical plane, and follow-up means responsive to movement of the control surface and connected to said yawmeter head to cause a rotation thereof tending to maintain said head parallel with the relatively moving air stream.

4. The structure as claimed in claim 3, in which means are provided independent of said follow-up means for manually rotating said yawmeter head to a preselected angle with respect to the longitudinal axis of the associated aircraft.

5. An automatic lateral and directional control for an airplane comprising, a reversible servomotor, operative connections between the servomotor and the airplane ailerons to actuate the same, selective control means for said servomotor, differential-pressure-responsive means for actuating said control means, a yawmeter head pivotally supported for lateral movement to either side of a central position parallel to the longitudinal axis of the associated airplane and exposed to a relatively moving air stream, said yawmeter head including a pair of dynamic pressure openings equally angularly disposed in a horizontal plane with respect to the longitudinal axis of said head, fluid pressure transmitting connections between said dynamic pressure openings and said differential-pressure-responsive device whereby differences in dynamic pressure at said openings are operative to cause selective operation of said servomotor control means and a follow-up responsive to operation of said servomotor to cause rotation of said yawmeter head in a direction tending to equalize any difference in pressure between said dynamic pressure openings due to yaw of the airplane with respect to the relatively moving air stream.

6. The structure as claimed in claim 5, including manually controlled means for rotating the longitudinal axis of said yawmeter head to make a desired lateral angle with respect to the longitudinal axis of the associated airplane.

RUDOLPH FINK.